United States Patent
McKenzie

(10) Patent No.: US 11,421,626 B2
(45) Date of Patent: Aug. 23, 2022

(54) NOZZLE-TO-ENGINE MOUNT REINFORCEMENT THROUGH WHICH MOUNTING FASTENERS ARE VISIBLE

(71) Applicant: United Technologies Corporation, Farmington, CT (US)

(72) Inventor: Michael J. McKenzie, Okemos, MI (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 334 days.

(21) Appl. No.: 16/654,684

(22) Filed: Oct. 16, 2019

(65) Prior Publication Data

US 2021/0115876 A1 Apr. 22, 2021

(51) Int. Cl.
| F02K 1/04 | (2006.01) |
| F02K 3/06 | (2006.01) |
| B64D 33/04 | (2006.01) |

(52) U.S. Cl.
CPC .............. *F02K 1/04* (2013.01); *B64D 33/04* (2013.01); *F02K 3/06* (2013.01); *F05D 2220/323* (2013.01); *F05D 2240/128* (2013.01); *F05D 2260/30* (2013.01); *F05D 2300/133* (2013.01)

(58) Field of Classification Search
CPC ..... F02K 1/04; B64D 33/04; F05D 2220/323; F05D 2240/128; F05D 2260/30; F05D 2300/133
See application file for complete search history.

(56) References Cited

U.S. PATENT DOCUMENTS

| 8,424,312 | B2* | 4/2013 | Conete | F01D 25/30 60/796 |
| 9,366,185 | B2* | 6/2016 | Salamon | F02K 3/06 |
| 9,945,817 | B2 | 4/2018 | Pember et al. | |
| 11,293,196 | B1* | 4/2022 | Volin | E04H 15/02 |
| 2007/0227152 | A1* | 10/2007 | Bunel | F02K 3/10 60/761 |
| 2010/0205930 | A1* | 8/2010 | Conete | F02K 1/04 29/889.22 |
| 2013/0223982 | A1* | 8/2013 | Durocher | F16B 5/04 415/12 |
| 2014/0023490 | A1* | 1/2014 | Hillier | F01D 11/00 415/173.6 |
| 2014/0369785 | A1* | 12/2014 | Revel | B21J 15/147 411/82.5 |

(Continued)

FOREIGN PATENT DOCUMENTS

EP 1647724 A1 4/2006

OTHER PUBLICATIONS

European Search Report Application No. EP20202132; dated Jul. 2, 2021; pp. 4.

*Primary Examiner* — Craig Kim
(74) *Attorney, Agent, or Firm* — Cantor Colburn LLP

(57) ABSTRACT

A nozzle assembly is provided and includes an outer cowl, an inner nozzle sleeve disposable within the outer cowl, nested support rings by which the outer cowl and the inner nozzle sleeve are coupled, sets of rivets to respectively connect the nested support rings to the inner nozzle sleeve, the nested support rings together and the nested support rings to the outer cowl and an elongate washer configured to reinforce three or more rivets of one or more of the sets of rivets.

20 Claims, 3 Drawing Sheets

(56) References Cited

U.S. PATENT DOCUMENTS

| | | | |
|---|---|---|---|
| 2017/0335863 A1* | 11/2017 | Dreischarf | F02C 7/14 |
| 2018/0029688 A1* | 2/2018 | Connelly | B64D 29/02 |
| 2019/0301362 A1 | 1/2019 | Petty et al. | |
| 2021/0115876 A1* | 4/2021 | McKenzie | F02K 1/04 |
| 2022/0059999 A1* | 2/2022 | Ritsema | B22F 7/062 |

\* cited by examiner

NOZZLE-TO-ENGINE MOUNT REINFORCEMENT THROUGH WHICH MOUNTING FASTENERS ARE VISIBLE

BACKGROUND

Exemplary embodiments of the present disclosure relate generally to gas turbine engines and, in one embodiment, to a nozzle-to-engine mount sheet or laminate form reinforcement through which mounting fasteners are visible.

A typical gas turbine engine includes a compressor, a combustor and a turbine. Inlet air is compressed in the compressor. Within the combustor, the compressed air is mixed with fuel and combusted to produce a high-temperature and high-pressure working fluid. The working fluid is then directed into the turbine where the working fluid is expanded to generated work. The expanded working fluid can then be output from the turbine into a nozzle, through which the working fluid lows before being exhausted to an exterior of the nozzle.

The nozzle can include an outer nozzle or cowl, an inner nozzle sleeve, inner and outer support rings by which the inner nozzle sleeve and the outer cowl are coupled and a nozzle-to-engine mount by which the nozzle is mounted to the gas turbine engine (i.e., the exhaust section of the turbine at the aft end of the turbine). The nozzle-to-engine mount can be provided, for example, as a T-flange of a forward end of the inner nozzle sleeve. An assembly process of the nozzle can include a connection of the inner support ring to an exterior surface of the inner nozzle sleeve, a connection of the outer support ring to the inner support ring and a connection of the outer support ring to an interior surface of the outer cowl. At each of these nozzle connections, rivets or fasteners (hereinafter referred to as "rivets") can be used to secure the connected parts together.

Over time, operations of a gas turbine engine and a nozzle cause the nozzle to pivot relative to the gas turbine engine and this pivoting results in rivet loading at each of the nozzle connections that can eventually cause cracking at or near certain rivets. Such rivet loading cannot be addressed by placing individual washers on each rivet due to the possibility of washers creating "loose part" incidents should their respective rivets fail.

Accordingly, a need exists for a component that can reinforce a nozzle-to-engine mount to address the problem of rivet loading without the possibility of creating "loose part" incidents.

BRIEF DESCRIPTION

According to an aspect of the disclosure, a nozzle assembly is provided and includes an outer cowl, an inner nozzle sleeve disposed within the outer cowl, nested support rings by which the outer cowl and the inner nozzle sleeve are coupled, sets of rivets to respectively connect the nested support rings to the inner nozzle sleeve, the nested support rings together and the nested support rings to the outer cowl and an elongate washer configured to reinforce three or more rivets of one or more of the sets of rivets.

In accordance with additional or alternative embodiments, the inner nozzle sleeve includes a nozzle-to-engine mount.

In accordance with additional or alternative embodiments, the nozzle-to-engine mount includes a T-flange, the nozzle assembly further comprises an additional set of rivets to connect the T-flange to a turbine and the elongate washer is further configured to reinforce three or more rivets of the additional set of rivets.

In accordance with additional or alternative embodiments, the nested support rings include an inner support ring and an outer support ring.

In accordance with additional or alternative embodiments, the elongate washer is visible from an exterior of the nozzle assembly.

In accordance with additional or alternative embodiments, the elongate washer is ring-shaped or nearly ring-shaped.

In accordance with additional or alternative embodiments, the elongate washer is formed to define one or more inspection windows between neighboring rivet locations.

In accordance with additional or alternative embodiments, the elongate washer is at least partially transparent.

According to another aspect of the disclosure, a gas turbine engine is provided and includes a turbine and a nozzle assembly, which is mountable to the turbine. The nozzle assembly includes an outer cowl, an inner nozzle sleeve disposed within the outer cowl, nested support rings by which the outer cowl and the inner nozzle sleeve are coupled, sets of rivets to respectively connect the inner nozzle sleeve to the turbine, the nested support rings to the inner nozzle sleeve, the nested support rings together and the nested support rings to the outer cowl and an elongate washer configured to reinforce three or more rivets of one or more of the sets of rivets.

In accordance with additional or alternative embodiments, the outer cowl and the inner nozzle sleeve are at least partially coaxial.

In accordance with additional or alternative embodiments, the inner nozzle sleeve includes titanium.

In accordance with additional or alternative embodiments, the inner nozzle sleeve includes a nozzle-to-engine mount by which the inner nozzle sleeve is mountable to an aft end of the turbine.

In accordance with additional or alternative embodiments, the nozzle-to-engine mount includes a T-flange.

In accordance with additional or alternative embodiments, the nested support rings include an inner support ring and an outer support ring.

In accordance with additional or alternative embodiments, the elongate washer is visible from an exterior of the nozzle assembly.

In accordance with additional or alternative embodiments, the elongate washer is ring-shaped or nearly ring-shaped.

In accordance with additional or alternative embodiments, the elongate washer is formed to define one or more inspection windows between neighboring rivet locations.

In accordance with additional or alternative embodiments, the elongate washer is at least partially transparent.

According to another aspect of the disclosure, an assembly is provided and includes a first sleeve, a second sleeve disposed within the first sleeve, one or more support rings by which the first and second sleeves are coupled, sets of rivets to respectively connect the one or more support rings together and to the first and second sleeves and an elongate washer configured to reinforce three or more rivets of one or more of the sets of rivets.

In accordance with additional or alternative embodiments, the elongate washer is formed to define one or more inspection windows between neighboring rivet locations or is at least partially transparent.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
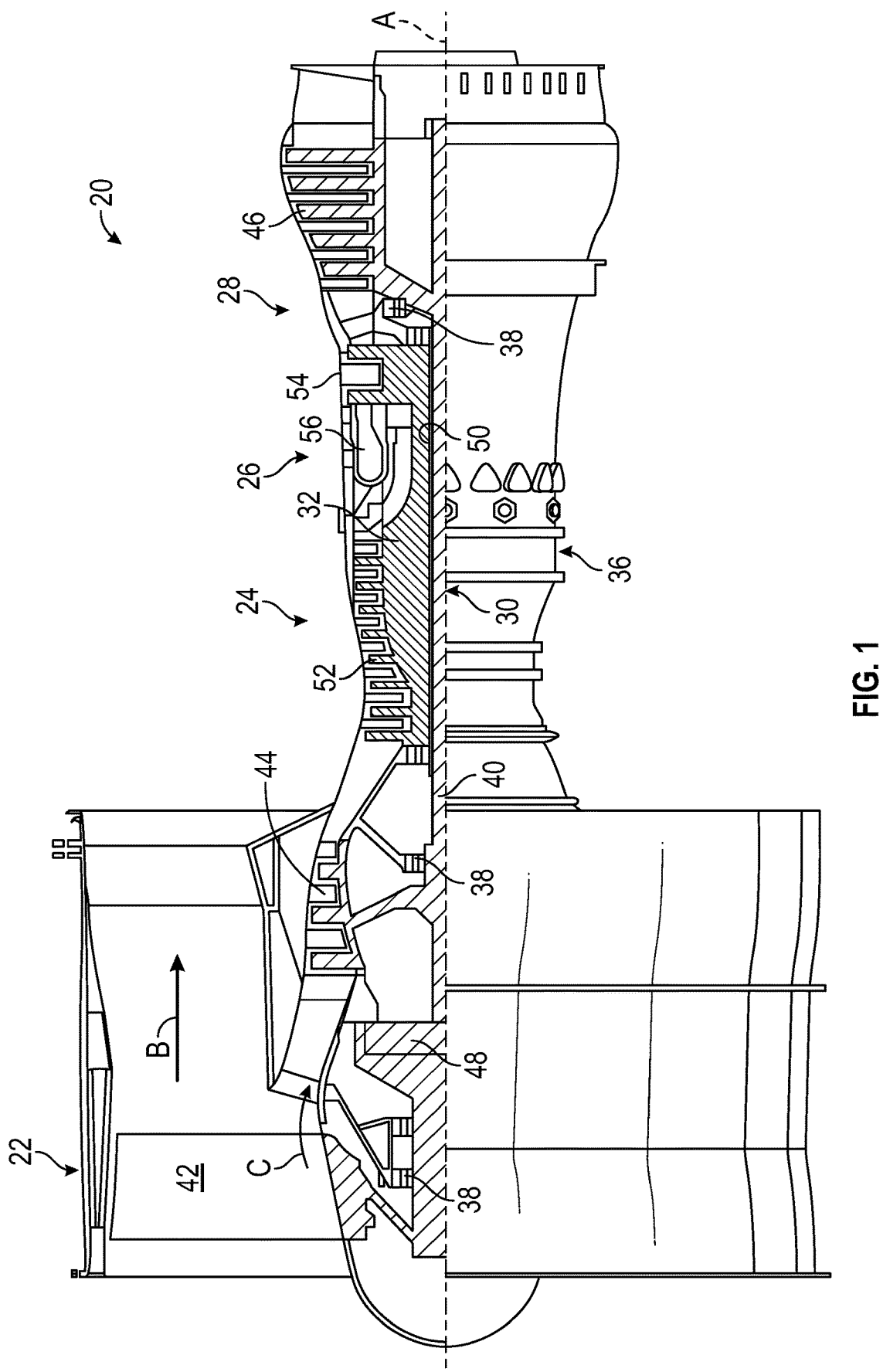
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

As will be described below, a doubler or an elongate washer is provided and can reinforce one or more connections of a nozzle-to-engine mount. The doubler or elongate washer (hereinafter referred to as an "elongate washer") is configured to address the problem of rivet loading without the possibility of creating "loose part" incidents in an event of rivet failures.

Figure 2:
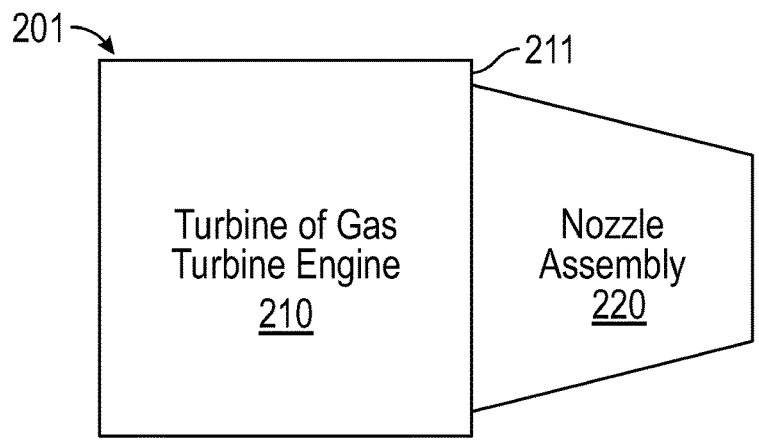
FIG. 2 is a schematic side view of a gas turbine engine with a nozzle attached thereto in accordance with embodiment.

With reference to FIG. 2, a gas turbine engine 201 is provided. The gas turbine engine 201 can be configured as the gas turbine engine 20 of FIG. 1 and includes a turbine 210, corresponding to the turbine section 28 of FIG. 1, and a nozzle assembly 220.

Figure 3:
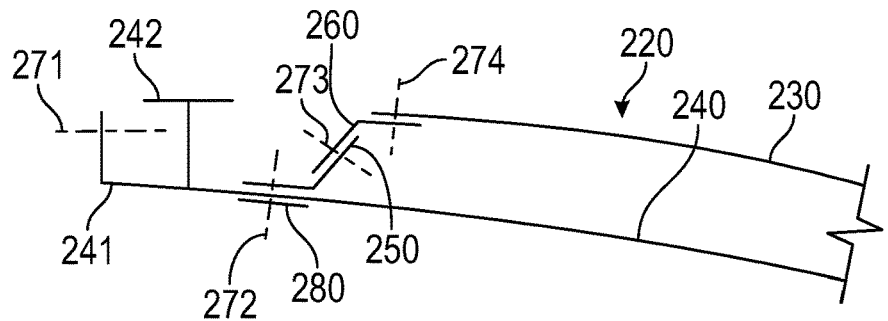
FIG. 3 is an enlarged schematic side view of a nozzle-to-engine mount for mounting the nozzle of FIG. 2 to the gas turbine engine of FIG. 2, nozzle connections and an elongate washer in accordance with embodiments.
Figure 4:
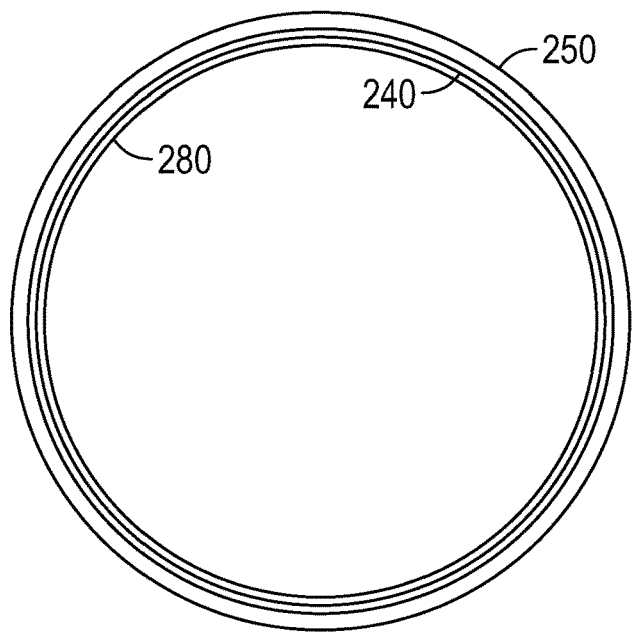
FIG. 4 is an axial view of nozzle connections and the elongate washer of FIG. 3 in accordance with embodiments.

With continued reference to FIG. 2 and with additional reference to FIGS. 3 and 4, the nozzle assembly 220 is mountable to the turbine 210 and includes a first sleeve or an outer cowl (hereinafter referred to as an "outer cowl") 230, a second sleeve or an inner nozzle sleeve (hereinafter referred to as an "inner nozzle sleeve") 240 that is disposed within the outer cowl 230 and inner and outer support rings 250 and 260, which are nested together. The inner nozzle sleeve 240 can include various materials including, but not limited to, titanium and other similar metals or metallic alloys. The inner nozzle sleeve 240 can include a nozzle-to-engine mount 241 by which the inner nozzle sleeve 240 is mountable to an aft end 211 of the turbine 210. In accordance with embodiments and, as shown in FIG. 2, the nozzle-to-engine mount 241 can include or be provided as a T-flange 242. The outer cowl 230 and the inner nozzle sleeve 240 are coupled by the inner and outer support rings 250 and 260 and are at least partially coaxial.

The nozzle assembly 220 further includes a first set of rivets 271 to connect the T-flange 242 of the inner nozzle sleeve 240 to the aft end 211 (see FIG. 2) of the turbine 210, a second set of rivets 272 to connect the inner support ring 250 to an exterior surface of the inner nozzle sleeve 240, a third set of rivets 273 to connect the inner support ring 250 and the outer support ring 260 together and a fourth set of rivets 274 to connect the outer support ring 260 to the outer cowl 230. The nozzle assembly 220 also includes an elongate washer 280. The elongate washer 280 is configured to reinforce three or more rivets of one or more of the first set of rivets 271, the second set of rivets 272, the third set of rivets 273 and the fourth set of rivets 274.

In each case (i.e., where the elongate washer 280 reinforces three or more rivets of one or more of the first set of rivets 271, the second set of rivets 272, the third set of rivets 273 and the fourth set of rivets 274), the elongate washer 280 is visible from an exterior of the nozzle assembly 220. That is, an inspector standing within the nozzle assembly 220 during a shut-down time can view the elongate washer 280 reinforcing the second set of rivets 272 and an inspector standing outside of the outer cowl 230 can view the elongate washer 280 reinforcing any of the first, third or fourth sets of rivets 271, 273 or 274.

It is to be understood that, while the elongate washer 280 is configured to reinforce three or more rivets of one or more of the first set of rivets 271, the second set of rivets 272, the third set of rivets 273 and the fourth set of rivets 274, the details of FIG. 2 illustrate that the elongate washer 280 is disposed to reinforce three or more rivets the second set of rivets 272. This is done for purposes of clarity and brevity, however, and should not be interpreted as limiting of the scope of the disclosure as a whole.

Being configured to configured to reinforce three or more rivets of one or more of the first set of rivets 271, the second set of rivets 272, the third set of rivets 273 and the fourth set of rivets 274, the elongate washer 280 is highly unlikely to present a possibility of a "loose part" incident since it is unlikely that two rivets it is reinforcing will fail and highly unlikely that three rivets it is reinforcing will fail. This redundancy increases the more rivets the elongate washer 280 reinforces and reaches a maximum in cases in which the elongate washer 280 is ring-shaped or nearly ring-shaped (i.e., extends around or nearly around an entirety of a circumference of the nozzle assembly 220 as shown in FIG. 4).

Figure 5:
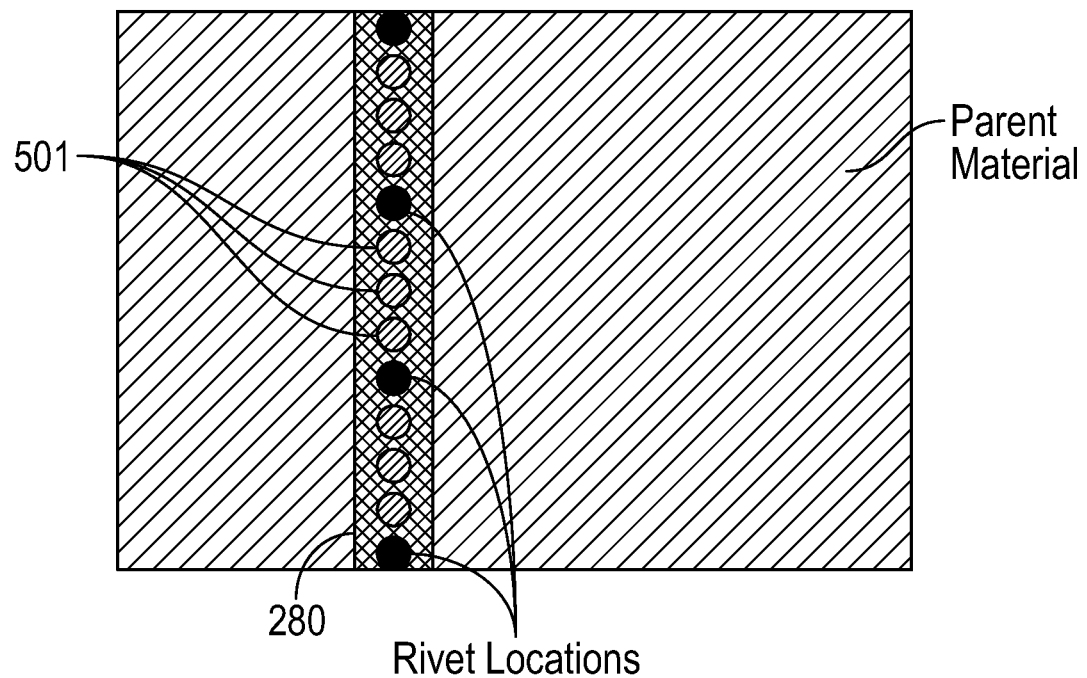
FIG. 5 is a radial view of an elongate washer used in the nozzle connections of FIGS. 3 and 4 in accordance with embodiments.
Figure 6:
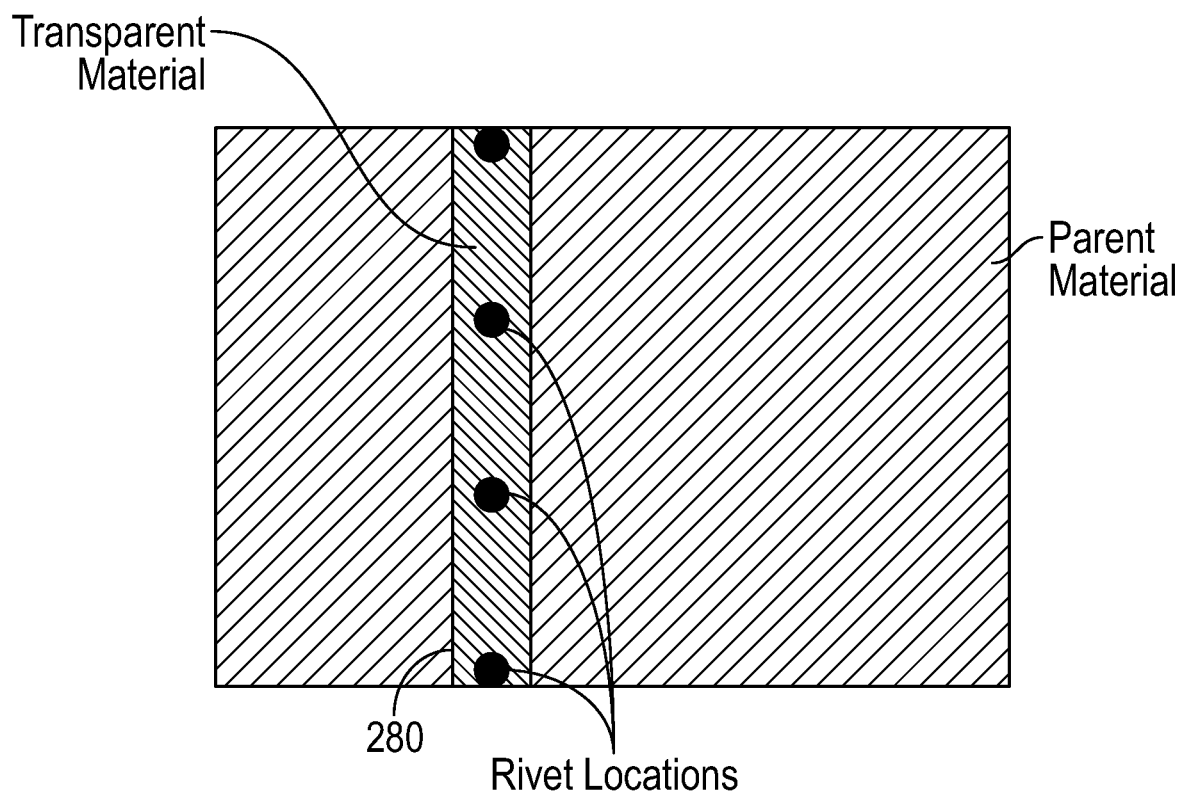
FIG. 6 is a radial view of a transparent elongate washer used in the nozzle connections of FIGS. 3 and 4 in accordance with embodiments.

With reference to FIGS. 5 and 6, the elongate washer 280 can be formed to define one or more inspection windows 501 between neighboring rivet locations 502 (see FIG. 5) or can be at least partially transparent (see FIG. 6). In each case, cracks propagating from rivets or cracks propagating around rivets can be Visible to an inspector during an inspection.

Benefits of the features described herein are the provision of an elongate washer 280 that allows an area of concern to be visually inspected. This avoids having to change printed instructions for continued airworthiness (ICA) and makes inspections with visual (i.e., non-destructive) methods possible.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A nozzle assembly for a gas turbine engine, comprising:
an outer cowl;
an inner nozzle sleeve disposed within the outer cowl;
nested support rings by which the outer cowl and the inner nozzle sleeve are coupled;
sets of rivets to respectively connect the nested support rings to the inner nozzle sleeve, the nested support rings together and the nested support rings to the outer cowl; and
an elongate washer configured to reinforce three or more rivets of one or more of the sets of rivets.

2. The nozzle assembly according to claim 1, wherein the inner nozzle sleeve comprises a nozzle-to-engine mount.

3. The nozzle assembly according to claim 2, wherein:
the nozzle-to-engine mount comprises a T-flange,
the nozzle assembly further comprises an additional set of rivets to connect the T-flange to a turbine, and
the elongate washer is further configured to reinforce three or more rivets of the additional set of rivets.

4. The nozzle assembly according to claim 1, wherein the nested support rings comprise an inner support ring and an outer support ring.

5. The nozzle assembly according to claim 1, wherein the elongate washer is visible from an exterior of the nozzle assembly.

6. The nozzle assembly according to claim 1, wherein the elongate washer is ring-shaped or nearly ring-shaped.

7. The nozzle assembly according to claim 1, wherein the elongate washer is formed to define one or more inspection windows between neighboring rivet locations.

8. The nozzle assembly according to claim 1, wherein the elongate washer is at least partially transparent.

9. A gas turbine engine, comprising:
  a turbine; and
  a nozzle assembly, which is mountable to the turbine and comprises:
    an outer cowl;
    an inner nozzle sleeve disposed within the outer cowl;
    nested support rings by which the outer cowl and the inner nozzle sleeve are coupled;
    sets of rivets to respectively connect the inner nozzle sleeve to the turbine, the nested support rings to the inner nozzle sleeve, the nested support rings together and the nested support rings to the outer cowl; and
    an elongate washer configured to reinforce three or more rivets of one or more of the sets of rivets.

10. The gas turbine engine according to claim 9, wherein the outer cowl and the inner nozzle sleeve are at least partially coaxial.

11. The gas turbine engine according to claim 9, wherein the inner nozzle sleeve comprises titanium.

12. The gas turbine engine according to claim 9, wherein the inner nozzle sleeve comprises a nozzle-to-engine mount by which the inner nozzle sleeve is mountable to an aft end of the turbine.

13. The gas turbine engine according to claim 12, wherein the nozzle-to-engine mount comprises a T-flange.

14. The gas turbine engine according to claim 9, wherein the nested support rings comprise an inner support ring and an outer support ring.

15. The gas turbine engine according to claim 9, wherein the elongate washer is visible from an exterior of the nozzle assembly.

16. The gas turbine engine according to claim 9, wherein the elongate washer is ring-shaped or nearly ring-shaped.

17. The gas turbine engine according to claim 9, wherein the elongate washer is formed to define one or more inspection windows between neighboring rivet locations.

18. The gas turbine engine according to claim 9, wherein the elongate washer is at least partially transparent.

19. An assembly for a gas turbine engine, comprising:
  a first sleeve;
  a second sleeve disposed within the first sleeve;
  one or more support rings by which the first and second sleeves are coupled;
  sets of rivets to respectively connect the one or more support rings together and to the first and second sleeves; and
  an elongate washer configured to reinforce three or more rivets of one or more of the sets of rivets.

20. The assembly according to claim 19, wherein the elongate washer is formed to define one or more inspection windows between neighboring rivet locations or is at least partially transparent.

* * * * *